Nov. 6, 1956  J. GRIEVE  2,769,421
INBOARD DRIVE FOR WATER CRAFT
Filed May 10, 1954  2 Sheets-Sheet 1

Inventor
John Grieve
By Egerton R. Case
Atty.

Nov. 6, 1956  J. GRIEVE  2,769,421
INBOARD DRIVE FOR WATER CRAFT
Filed May 10, 1954  2 Sheets-Sheet 2

Inventor
John Grieve
By Egerton R. Case
Atty.

United States Patent Office 2,769,421
Patented Nov. 6, 1956

---

2,769,421

INBOARD DRIVE FOR WATER CRAFT

John Grieve, Paris, Ontario, Canada, assignor of one-half to Charles Harper, Brantford, Ontario, Canada Application May 10, 1954, Serial No. 428,751

2 Claims. (Cl. 115—53)

This invention relates to inboard drives for water craft and the objects of the invention are:

To protect the propeller, or paddle wheel, from contact with floating objects, and mount it within the craft.

To direct the flow of water directly to the propeller as it enters the boat to thereby make the most efficient use thereof in power development.

To ensure against any mechanical obstruction to the outflow of the water from the boat thereby promoting efficiency of the propeller.

To protect the stream of water as it is ejected from the boat against any lateral expansion thereby obtaining the maximum efficiency from this mechanically generated stream.

To mount the transmission gear so that the stub shaft thereof may be readily adjusted to the angular position of the engine shaft, and coupled thereto.

In the drawings, like characters of reference refer to the same parts.

Two units of this drive have been shown, one on each side of the keel to promote ease of steering the boat, but only one unit may be used with the propeller straddling the longitudinal axis of the boat.

The construction of the boat these units are to be used on forms no part of this invention.

Figure 1:
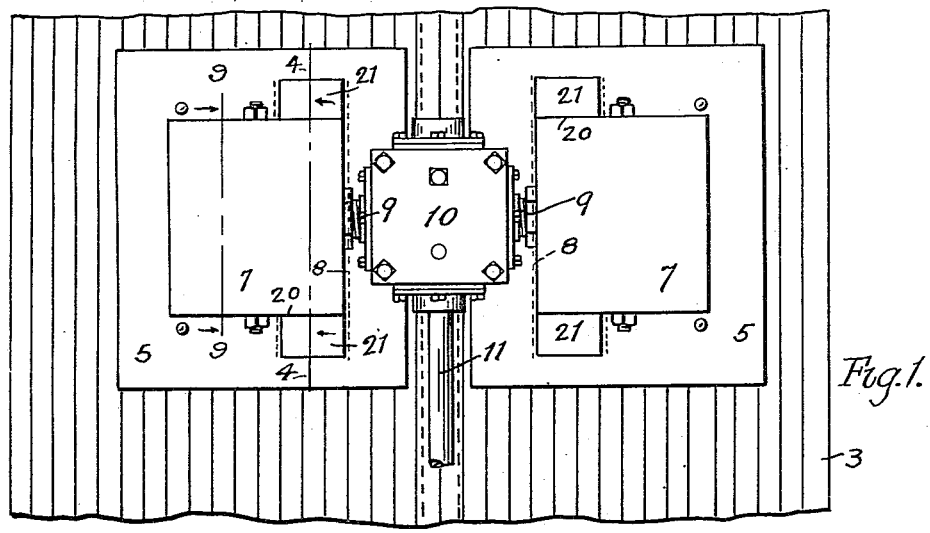
Fig. 1 is a plan view of two units of this mechanism, and the transmission gear mounted therebetween, on the top side of a boat, each unit being located on opposite sides of the keel of the boat.

When two units are used, aligned openings 2 (Fig. 4) are made in the bottom 3 of the boat, one on each side of the keel 4 (Fig. 2) when a keel forms part of the boat. Suitably fastened to the upper side of the bottom of the boat are base-plates 5, each having an opening 6 therethrough (Fig. 3) in alignment with an opening 2. Forming part of each base-plate 5 is a housing 7 which projects above the top side of the bottom of the boat, and journalled in the inner end wall 8 (Fig. 1) of each housing are the shafts 9 of the gearing within the gear-box 10 which is located between a pair of housings 7 and receives power through the shaft 11 from any suitable source of power (not shown). So mounting the shafts 9 in the housings permits the gear-box to be moved so that the shaft 11 may be tilted up or down to be conveniently coupled to the engine (not shown) which generates the motive power for the propeller wheels.

Keyed to each shaft 9 is a propeller shown in the form of a paddle wheel 12. These wheels are located adjacent the walls 8 at the inner end of each housing 7.

The opening 6 in each base-plate 5 forms a mouth for the housings 7. Mounted in each housing 7 is a channel 13 which extends transversely of the boat. Each channel 13 has an open under side and is tapered longitudinally and the edge of the open side of each lies in the same plane as the opening 6 in its housing 7. These channels 13 are preferably tapered so they will be wider at their inner ends so thereby to lead the flowing water direct to the propellers for the full diameter thereof. The inner side and top walls of the chambers in the housings 7 could be molded into the same form as said channels, if desired.

To prevent the water filling the chambers in the housings 7 from interfering with the streams of water generated by the propeller wheels, these streams are prevented from spreading laterally by a flanged channel 14 located longitudinally of the boat over each propeller wheel 12, the vanes of which have clearance with the bottom plate 15, of these channels.

Figure 8:
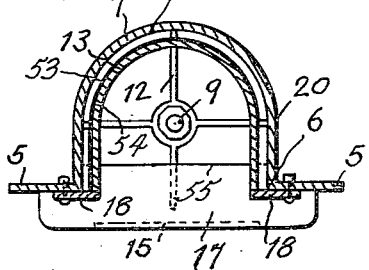
Fig. 8 is a vertical cross section on the line 8—8, Fig. 7.
Figure 9:
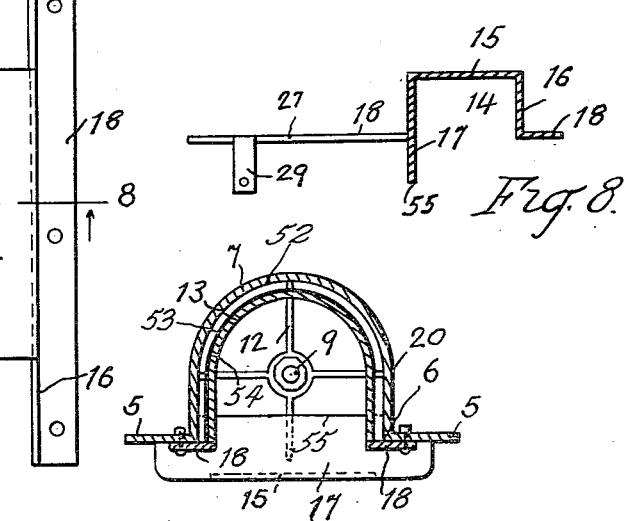
Fig. 9 is a vertical section on the line 9—9, Fig. 1.

Each channel 14 has vertical side walls 16 and 17, each being provided with a flange 18 whereby each channel is secured to its base-plate 5 (Figs. 8 and 9).

Figure 10:
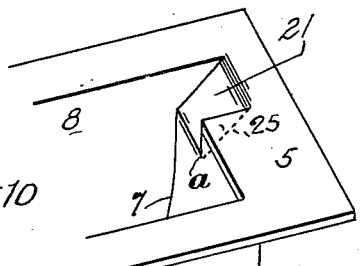
Fig. 10 is a fragmentary view in perspective of the under-side of an offset structure forming the mouths of a longitudinal channel, shown in cross section in Fig. 4.
Figure 6:
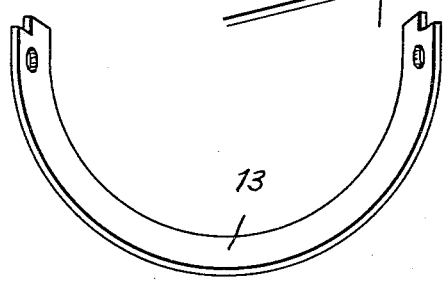

As shown in Figs. 8 and 9, the outer wall 17 of each channel 14 extends higher than the other side wall 16 each of which latter rests upon its associated base-plate 5, thus, together with the associated end wall 8 of the housing 7 (Figs. 3, 4, and 10), closes one side of the channels 14. The higher walls 17 extend up into the housings 7 adjacent the outer side of each propeller wheel and well above the lowest path of movement of the vanes of the propeller wheels, thus closing the other side of the channel and ensuring protection of the stream of water forced outwardly by these wheels from interference by the water in the channels 13, and preventing expansion on this other side of the stream of water propelled by the propeller wheels.

Figure 4:
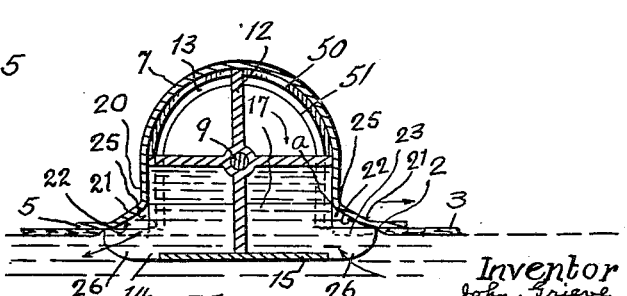
Fig. 4 is a vertical section on the line 4—4, Fig. 1.
Figure 5:
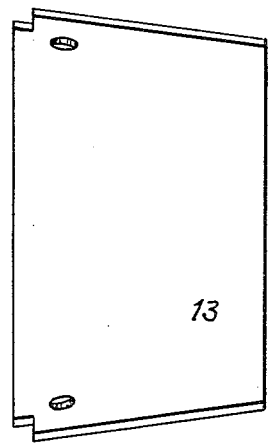
Figs. 5 and 6 are respectively plan and end views of the transverse channel.
Figure 7:
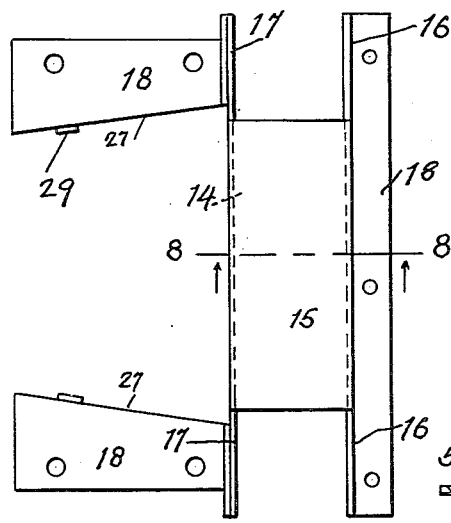
Fig. 7 is a plan view of the under side of the longitudinal channel directing the flow of water ejected by the propeller, longitudinally of the boat.

As shown in Figs. 4 and 7 the bottom plate 15 of the channel 14 is not quite as long as the distance between the inner surfaces of the side walls of the housings 7; and it is spaced below the bottom of the boat, and it will be seen that the walls 16 and 17 extend beyond the ends of the bottom 15.

Aligned parts of opposite sides at each base-plate 5 and the side walls 20 of the housings 7 and wholly in alignment with the propeller wheels 12, and of the same width thereof, are offset upwardly at 21 (Figs. 1 and 4), thus providing an outwardly-downwardly sloping surface 22 (Figs. 4 and 10) forming portion of the mouth of a channel 23 above said base-plate and closed on one side by the end wall 8 at one end of the housing, and at the other side closed by a wall 25 formed by the offset structure.

The edge of the wall 17 extends up to the top end $a$ (Fig. 4) of the wall 25, and therefore the walls 17 and 25, on their side of the channel 14, give ample lateral support in depth to the current being forced through the channel 14.

With the construction just described, the bottom plate 15, and the ends of the walls 16 and 17, provide a mouth 26 at each end of each channel 14 through which a stream of water is forced by the propeller wheels.

From Fig. 4 it will be noticed that there is no mechanical obstruction to be met with by the streams of water when passing through the mouths 26, and therefore the full force possessed by said streams will be exerted against the body of water outside the boat. This is a critical feature of this invention.

Figure 2:
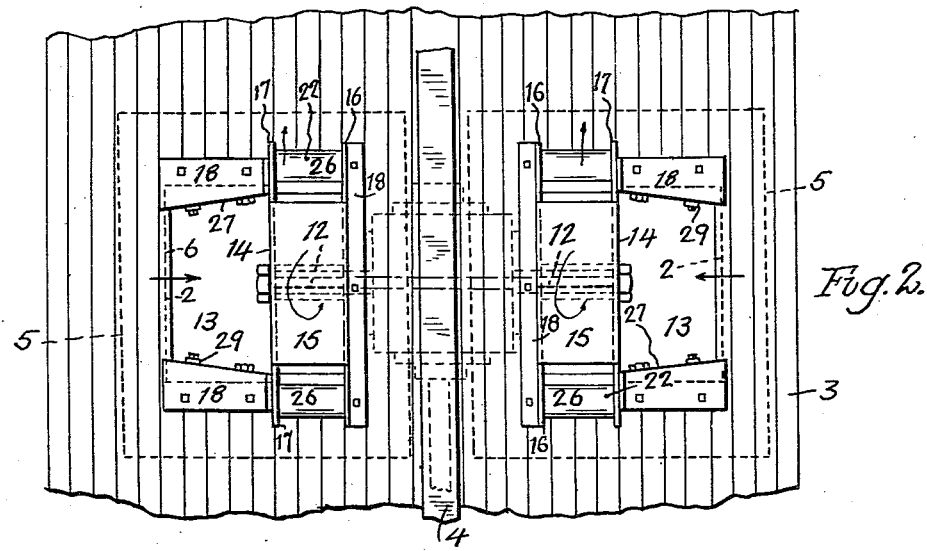
Fig. 2 is a plan view of the bottom side of the boat showing the openings therethrough at each side of the keel; the underside of the housings for the propellers over said openings, and the longitudinal and transverse channels to direct the incoming and outgoing streams of water.
Figure 3:
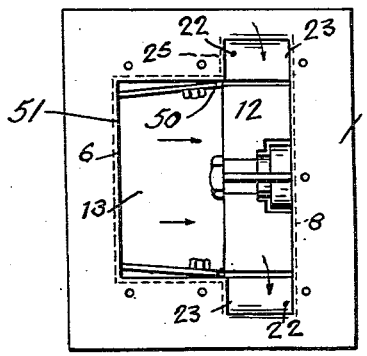
Fig. 3 is a bottom-side view of one propeller and a base-plate adapted to be bolted to the boat. This view also shows the transverse channel located to direct the flow of water to the propellers.

Upon reference to Fig. 2 it will be seen that the inner sides 27 of the flanges 18 slope inwardly. This construction conforms to the tapered form of the channels 18 and lies over the edges of these channels. This construction is for the purpose of preventing any material volume of water from being inactive through accumulating in the space between (see Fig. 9) the channels 13 and the housings 7. When the channels 13 are integrally formed with the housings 7 the illustrated construction of the sloping sides of the flanges 18 may be dispensed with. A bracket 29 is carried by each flange 18 to secure it firmly to its channel 13.

From the foregoing it will be clearly seen that the bottom plate 15 and side walls 16 and 17 of the channel 14 protect the propeller wheels from contact with ground and floating objects.

Various changes in construction may be made in that herein described and shown in the drawings without departing from the scope of this specification and the claims thereof.

I claim:

1. An inboard drive for water craft comprising a base-plate provided with a central opening therethrough and adapted to be fastened to the upper side of the bottom of a boat over a like opening therethrough; a wall-provided housing forming part of said base-plate and extending thereabove and having a bottom opening in alignment with said central opening; an inner end wall of said housing; a propeller wheel journalled in and adjacent said inner end wall and operating through said base-plate, the open bottom of said housing and said boat-bottom; aligned parts at opposite sides of said base-plate, and the adjoining side walls of the housing, offset upwardly wholly in alignment with said propeller wheel, thus forming an outwardly-downwardly sloping surface having at the outer side thereof a wall formed from said base-plate and said housing, the offset structure thus forming portion of the mouth of a channel; another channel comprising a bottom plate; a vertical wall at each side of said bottom of greater length than said bottom plate and extending above said bottom plate into contact with said base-plate; means whereby said wall-provided channel is attached to said base-plate over said propeller wheel and above said sloping surface to provide therewith a mouth at each end of said bottom plate through which a stream of water is forced by said propeller wheel and a channel tapered longitudinally and provided with an open under side, located in said housing laterally of said propeller wheel with its wider end at the adjacent side of said wheel to positively direct water to said wheel for the diameter thereof.

2. In an inboard drive for water craft, in combination a flange-provided housing having an open bottom; a vertical end wall of said housing; a propeller wheel journalled in said vertical end wall and adjacent said wall; an outwardly-downwardly sloping surface embraced in said housing and located wholly in alignment with said propeller wheel and immediately adjoining said end wall; a vertical wall at the other side of said sloping surface; a plate extending longitudinally of said propeller wheel in spaced relationship below the same, and a vertical wall carried by each side of said plate with each end thereof extending beyond said plate and located one at each side of said sloping surface.

References Cited in the file of this patent

UNITED STATES PATENTS

| 1,111,988 | Bell | Sept. 29, 1914 |
| 2,413,173 | Cote | Dec. 24, 1946 |

FOREIGN PATENTS

| 348,157 | France | Apr. 4, 1905 |
| 558,204 | Great Britain | Dec. 24, 1943 |